United States Patent
Saghir et al.

(10) Patent No.: US 11,678,195 B2
(45) Date of Patent: Jun. 13, 2023

(54) OPTIMIZED ROUTING FOR LAW ENFORCEMENT SUPPORT

(71) Applicant: VERIZON PATENT AND LICENSING INC., Basking Ridge, NJ (US)

(72) Inventors: Amir Saghir, Frisco, TX (US); Raul Buendia Iglesias, Highland Village, TX (US); Rakesh Chandwani, Morganville, NJ (US); Michael Chen, Pittstown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/356,759

(22) Filed: Jun. 24, 2021

(65) Prior Publication Data

US 2022/0417756 A1     Dec. 29, 2022

(51) Int. Cl.
*H04W 12/80*     (2021.01)
*H04W 64/00*     (2009.01)
*H04L 9/40*      (2022.01)

(52) U.S. Cl.
CPC ............ *H04W 12/80* (2021.01); *H04L 63/30* (2013.01); *H04W 64/003* (2013.01)

(58) Field of Classification Search
CPC ...... H04W 12/80; H04W 64/003; H04L 63/30
See application file for complete search history.

(56) References Cited

U.S. PATENT DOCUMENTS

| | | | | |
|---|---|---|---|---|
| 2004/0157629 A1* | 8/2004 | Kallio | ................ | H04M 3/2281 455/450 |
| 2011/0314177 A1* | 12/2011 | Harp | .................... | H04L 63/306 709/238 |
| 2013/0007286 A1* | 1/2013 | Mehta | .................. | H04W 76/10 709/227 |
| 2013/0286869 A1* | 10/2013 | Woelker | ............... | H04W 12/80 370/252 |
| 2015/0200972 A1* | 7/2015 | Suryavanshi | ....... | H04L 63/0428 726/1 |
| 2015/0334202 A1* | 11/2015 | Frydman | ............... | H04L 67/568 370/328 |
| 2016/0072850 A1* | 3/2016 | Zhang | .................. | H04L 63/306 726/12 |
| 2016/0295481 A1* | 10/2016 | Jayaraman | ............. | H04L 63/30 |

* cited by examiner

*Primary Examiner* — Azizul Choudhury

(57) ABSTRACT

An improved lawful intercept (LI) infrastructure is described. In response to a valid LI provisioning request, a subscriber management component statically allocates a user equipment (UE) subject to the LI provisioning request to an edge location comprising a high-speed gateway and a Mediation and Delivery Function (MDF), which coordinates the delivery of intercepted communications. The subscriber management component maintains this allocation for the life of the LI provisioning request and reverses the UE to a dynamic gateway allocation scheme when the LI provisioning request ends. As a result, only a subset of edge locations must be equipped with MDFs, and the handover is transparent to the UE.

20 Claims, 6 Drawing Sheets

OPTIMIZED ROUTING FOR LAW ENFORCEMENT SUPPORT

BACKGROUND INFORMATION

Cellular networks provide facilities for supporting lawful intercept requests from law enforcement agency organizations. In response to a valid warrant or request, such cellular networks can forward data, voice, and other communications to a law enforcement agency associated with the warrant or request.

DETAILED DESCRIPTION OF EXAMPLE EMBODIMENTS

Figure 1:
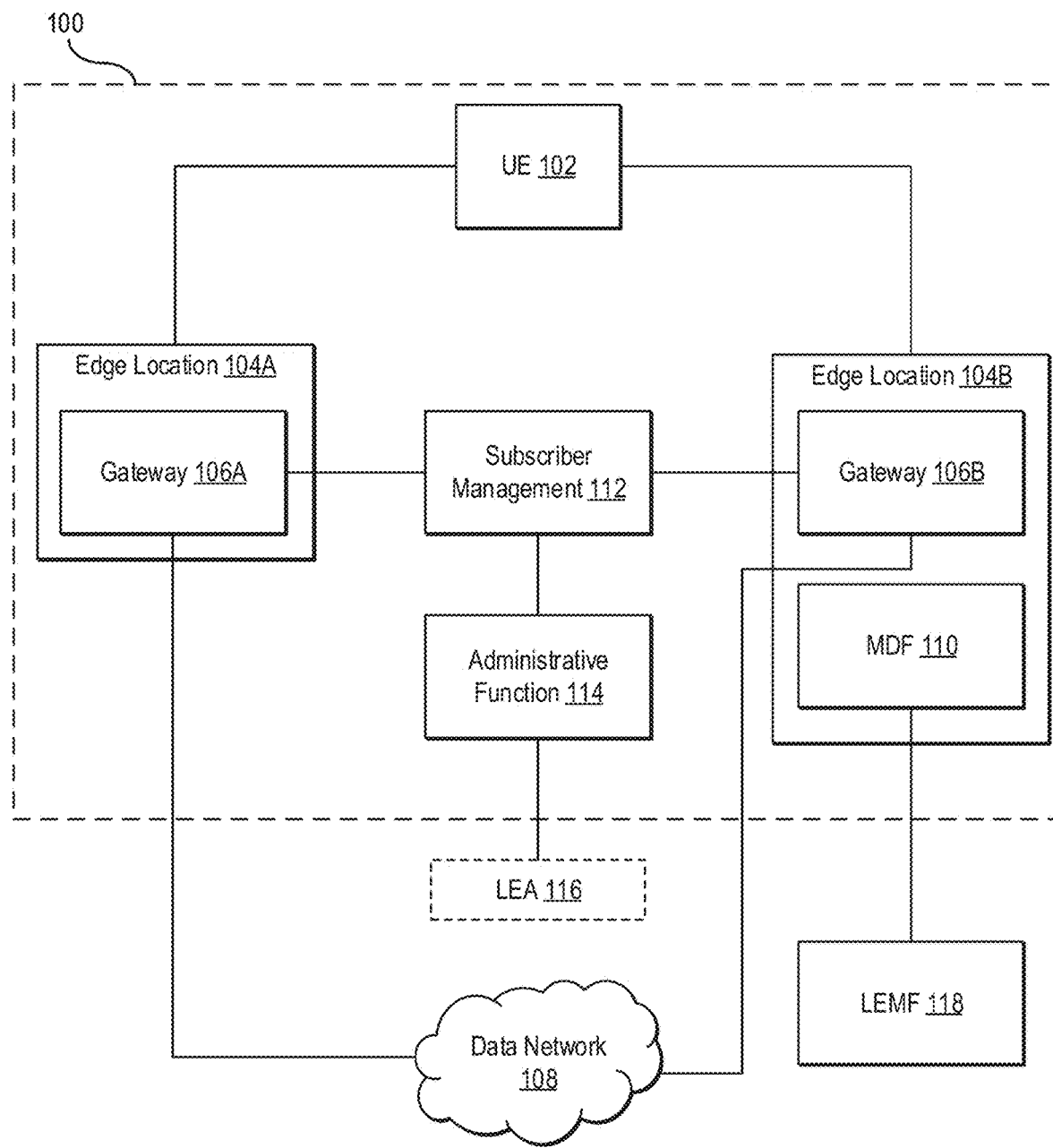
FIG. 1 is a block diagram of a cellular network providing a lawful intercept facility according to some embodiments.

In a cellular network, Mobile Network Operators (MNOs) provide facilities to support Lawful Intercept (LI) requests from law enforcement agencies, regulatory or administrative agencies, or intelligence services (collectively referred to as LEAs). LEAs communicate with a cellular network via an administrative interface such as an Administration Function (ADMF) and receive data via a delivery interface such as a Mediation and Delivery Function (MDF). For example, an LEA can issue a valid request (e.g., warrant) to an ADMF via an internal Lawful Interception Control Function (LICF) of the ADMF. The LICF can communicate with one or more Lawful Interception Provisioning Functions (LIPFs). The LIPFs provision one or more Point of Interception (POI) instances which perform the interception of communications (e.g., data and/or voice) from User Equipment (UE). The POI instances are generally implemented in one or more core network components. For example, POI instances can be instantiated in a mobility manager, a serving and packet gateway, a subscriber database, and/or other core network component(s). In some deployments, a cellular network may have many instances of such geographically dispersed components. These POI instances then forward the intercepted communications to an MDF which delivers the communications to the appropriate Law Enforcement Monitoring Facility (LEMF). As with POI instances, MDFs may be dispersed through a cellular network at various Mobile Edge Computing (MEC) locations. However, not all MEC locations may include MDFs. Thus, if a UE is communicatively coupled to a MEC location not equipped with its own MDF, and the UE is subject to an LEA request (e.g., warrant), communications with the UE must be forwarded to another MEC location equipped with an MDF to enable an LI function.

While a cellular network can theoretically be expanded to provide MDFs at each MEC location, such a solution is not reasonable given the number of MEC locations that would be required to be upgraded and the complexities of deploying and maintaining such an extensive separate MDF infrastructure. In addition, modern cellular network user traffic data rates can be very high. Thus, having a reliable and encrypted transmission back to one or more centralized MDFs with variable delays and jitter in the network may present challenges.

The disclosure describes embodiments for automatically handing over user communications from UEs where gateways are not co-located or closely located with MDFs to gateways that are co-located or closely located with MDFs. This allows for a smaller number of MDFs to support a larger number of MEC locations and thus a larger number of serving and packet gateways. The handover (from location to location) can be performed as soon as a valid request (e.g., warrant) is received from an LEA. The embodiments disclose an exemplary algorithm used to determined, based on network topology, to which MEC location to hand over the UE. In some embodiments, a monitor can also be deployed to monitor requests' statuses. This monitor can automatically "revert" a handover of the UE to the previous MEC location once the request is completed.

In some embodiments, UE traffic of the LI target subscribers can be directed to LTE, eLTE, or LTEa (e.g., 4G) gateways, as well as 5G gateways that are closely located where the MDFs are deployed. In an embodiment, traffic routing can be switched for a subscriber as soon as it is provisioned as an LI target in the network. In an embodiment, an algorithm in the subscriber management component (e.g., UDM or HSS) can determine, based on a configured topology of cellular network nodes, how to assign the closest edge locations where the MDF functions are deployed. In an embodiment, the network can detect any change in LI requests to revert the UE routing back to a default gateway.

In the various embodiments, methods, devices, and non-transitory computer-readable storage media are provided for implementing the above embodiments. In these embodiments, a cellular network (e.g., via subscriber management component) allocates a first gateway to User Equipment (UE). This first gateway may be a cellular network gateway that does not support a Lawful Intercept (LI) function. While the UE is attached to the network, the cellular network can receive a provisioning request that identifies an LI target associated with the UE. In response, the network may identify a second gateway that supports an LI function from a set of gateways supporting an LI function. This identification can be performed in a variety of ways. In an embodiment, identifying a second gateway can include identifying the second gateway identified based on traffic volumes at each of the set of gateways. In another embodiment, identifying a second gateway can comprise identifying the second gateway identified based on a distance from the UE.

After identifying a second gateway, the network may update a gateway allocation for the UE. This update may cause the UE to communicate with a second gateway and disconnect from the first gateway. After updating the gateway allocation, the network may perform an LI function at the second gateway while the provisioning request is valid.

In some embodiments, the gateway allocation may be periodically updated to maintain a communication session between the UE and a second gateway. In some embodiments, if it is determined that the provisioning request has expired the gateway can update the allocation to release the UE from the second gateway.

FIG. 1 is a block diagram of a cellular network (100) providing a lawful intercept facility according to some embodiments.

In the illustrated embodiment, a UE (102) can be communicatively coupled to edge location (104A) or edge location (104B). In an embodiment, an edge location, such as edge location (104A) or edge location (104B), can comprise a physical location storing cellular core network infrastructure. In an embodiment, a given edge location can also include components of a radio access network (RAN) such as an eNodeB or gNodeB. Details of some types of RAN and core network components are provided in connection with FIGS. 4 and 5. In some embodiments, each edge location includes a gateway, such as a packet gateway or serving gateway or User Plane Function (UPF). For example, edge location (104A) includes a gateway (106A) while edge location (104B) may include gateway (106B). Gateway (106A) and gateway (106B) can enable user data, voice, or other communications capabilities to the UE (102). In an embodiment, gateway (106A) and gateway (106B) can each provide access to a packet data network (108) such as the public Internet. In one embodiment, gateway (106B) can comprise a high-speed gateway configured to low latency data transmissions. Conversely, in one embodiment, gateway (106A) can comprise a low-speed gateway relative to gateway (106B). In some embodiments, UE (102) connects to a given edge location as it moves. Thus, in normal (i.e., non-LI) scenarios, UE (102) can connect to edge location (104A) or edge location (104B), as well as other non-illustrated edge locations. While only two edge locations are illustrated, the disclosure places no limitation on the types and numbers of edge locations in the network.

In an embodiment, when UE (102) is communicatively coupled to edge location (104A) and gateway (106A), the edge location (104A) can provide standard cellular services (e.g., voice, text, and data). Details of this mode of operation are provided further in the descriptions of FIGS. 4 and 5.

However, in an embodiment, the cellular network (100) can transparently route traffic of the UE (102) to edge location (104B). In the illustrated embodiment, edge location (104B) is configured to provide LI functionality to LEAs. In an embodiment, LI functionality in edge location (104B) is provided via an MDF (110). In an embodiment, MDF (110) performs all tasks related to the delivery of intercepted communications to the LEMF (118). In an embodiment, the MDF (110) receives information related to active intercepts from the other network elements (e.g., gateway 106B) within the cellular network (100). In some embodiments, the MDF (110) can process or parse this information and transmit the processed or parsed information to LEMF (118). Thus, when UE (102) is handed over from edge location (104A) to edge location (104B) due to an LI provisioning request, and the UE (102) is subjected to interception, the MDF (110) can intercept some or all communications of the UE (102), process the communications, and transmit the processed communications to the LEMF (118). The operation of MDF (110) can be performed according to any relevant standard for lawful interception, and is not described herein for the sake of clarity.

In an embodiment, an LEA (116) can communicate with the cellular network (100) via an administrative function such as ADMF (114). As used herein, an LEA can refer to an entity or organization responsible for submitting warrants or other requests to the cellular network (100). In an embodiment, the ADMF (114) receives data from an LEA (116) and sends out commands over a defined interface (e.g., X1) to set up communication nodes in the cellular network (100) and the MDF (110) to perform interception and send the intercepted communications to the designated recipients such as a Law Enforcement Monitoring Facility, LEMF (118). In an embodiment, the ADMF (114) receives request (e.g., warrant) data identifying a subscriber to intercept. In an embodiment, the ADMF (114) processes, validates, and forwards this data to a subscriber management component (112).

The subscriber management component (112) can receive the identification of a subscriber and initiate a handover of the UE (102) from edge location (104A) to edge location (104B). In an embodiment, the subscriber management component (112) can comprise a Home Subscriber Server (HSS) or a Unified Data Management (UDM) in combination with a Unified Data Repository (UDR) component. In an embodiment, the subscriber management component (112) identifies one or more UE, such as UE (102), corresponding to a subscriber. The subscriber management component (112) can further identify a gateway, such as gateway (106A), the UE (102) is currently attached to and request that the UE (102) attach to a different packet gateway. In an embodiment, the subscriber management component (112) performs the hand over by updating a gateway allocation for UE (102). As will be described, a provisioning component (not illustrated) can be configured to periodically monitor LI requests and instruct the subscriber management component (112) to update or maintain the gateway allocation. As used herein, the assignment of a UE (102) to an edge location supporting LI is referred to as a static assignment since the UE (102) will remain connected to such an edge location as long as the LI provisioning request is valid. This can ensure timely and consistent delivery of intercepted communications by an edge location equipped with an MDF (110). By contrast, normal operations of the cellular network (100) are referred to as dynamically assigned since the UE (102) can connect to various gateways based on network conditions and geographic distance, among other factors. Ultimately, an LI provisioning request can expire or the LEA (116) may affirmatively end the LI provisioning request. In such a scenario, subscriber management component (112) can update the gateway allocation policy to revert to dynamically assigning edge locations (and thus gateways) to the UE (102). In some embodiments, after reverting the assignment policy, the UE (102) can remain communicatively coupled to a current gateway (e.g., 104B) if the current gateway is the optimal gateway given the location of the UE (102) and network conditions.

As an example, UE (102) can be communicatively coupled to edge location (104A) and gateway (106A) prior to an intercept request. LEA (116) can issue a request to ADMF (114) to intercept communications associated with the UE (102). The ADMF (114) can validate this request (e.g., validate a request or warrant) and can identify the UE (102) (e.g., via IMSI or similar identifier) to the subscriber management component (112). In response, the subscriber management component (112) can determine a current edge location that the UE (102) of the subscriber is connected. As one example, UE (102) can be communicatively coupled to edge location (104A). The subscriber management component (112) can determine that the current edge location does not support an LI function (e.g., no MDF is located at the edge location 104A). The subscriber management component (112) can next identify an edge location (104B) that includes an MDF (110). In an embodiment, subscriber management component (112) can identify an edge location having an MDF that is closest to the UE (102) (either physically or based on perceived or actual latency), such as edge location (104B). In some embodiments, the subscriber management component (112) can utilize traffic volumes to determine which edge location should receive the UE (102) traffic. Alternatively, or in conjunction with the foregoing, the subscriber management component (112) can utilize latency or physical distances from the UE (102) to determine which edge location should receive the UE (102) traffic. Once the UE (102) is communicatively coupled to the edge location (104B), the MDF (110) can receive the intercepted communications and forward the communications to LEMF (118) while a valid request (e.g., warrant) is in place. When the request (e.g., warrant) terminates, in some embodiments, the subscriber management component (112) can hand over the UE (102) back to the edge location (104A) or any other edge location. In some embodiments, this second handover is also transparent to the user of the UE (102) or not required at all.

Figure 2:
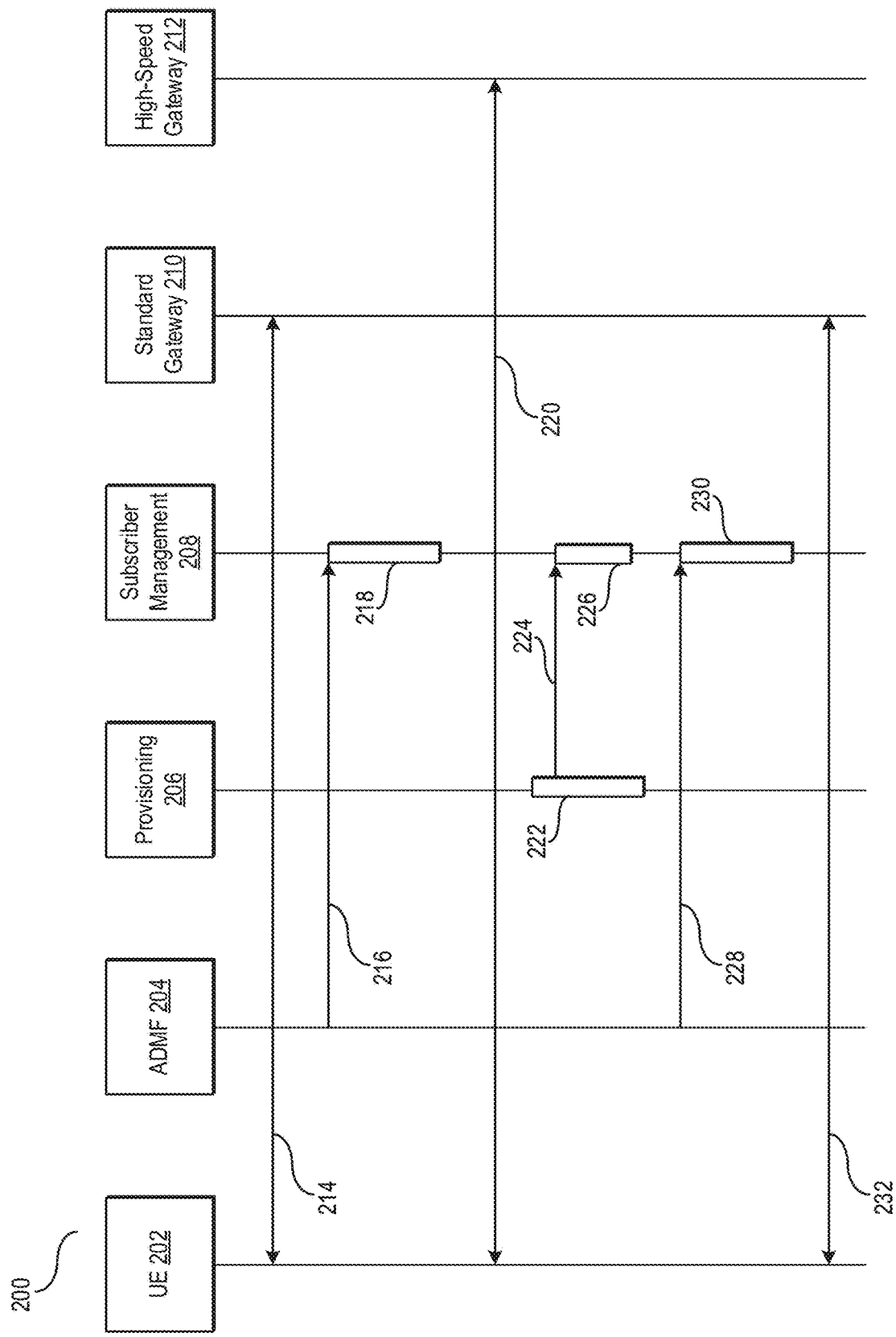
FIG. 2 is a call flow diagram illustrating a method for performing a gateway re-allocation in response to a lawful intercept request according to some embodiments.

FIG. 2 is a call flow diagram illustrating a method (200) for performing a gateway re-allocation in response to a lawful intercept request according to some embodiments.

In an embodiment, method (200) can be initiated during a standard cellular data or voice session. As such, method (200) begins when UE (202) is attached to and communicating through standard gateway (210) in step 214. In some embodiments, standard gateway (210) corresponds to gateway (106A). In an embodiment, the standard gateway (210) can comprise a packet gateway or similar gateway. In an embodiment, the standard gateway (210) can comprise a User Plane Function (UPF) in a 5G network or a Packet Data Network Gateway (PDN-GW) in a 4G network. In an embodiment, during step 214 standard cellular user and control data flows can be performed, the details of which are not limited by the present disclosure.

In step 216, an ADMF (204) issues a provisioning request to a subscriber management component (208). In one embodiment, an LIPF of ADMF (204) issues the provisioning request. In an embodiment, the provisioning request can be issued from the ADMF (204) to the subscriber management component (208) over an LI_X1 interface. In an embodiment, subscriber management component (208) can comprise a UDM or HSS component in a 5G or 4G network, respectively. In such an example, the subscriber management component (208) can include an IRI-POI (Intercept Related Information) function to act as the endpoint of the L1_X1 interface. In brief, an LICF present in the ADMF (204) receives the request (e.g., warrant) from an LEA, derives the intercept information from the request (e.g., warrant), and provides it to the LIPF. The LIPF present the in the ADMF provisions an IRI-POI (over LI_X1) present in the subscriber management component (208) and MDF via an L1_X2 interface.

In an embodiment, after receiving the X1 provisioning request the subscriber management component (208) initiates a handover procedure in step 218 whereby the UE (202) disconnects from the standard gateway (210) and connects to the high-speed gateway (212). In one embodiment, this step 218 can be performed in conjunction with, or prior to, the MDF initialization described previously. In an embodiment, the subscriber management component (208) automatically updates a gateway allocation for the UE (202) subject to the provisioning request. In an embodiment, this update comprises handing over the UE (202) from the standard gateway (210) to a high-speed gateway (212). In an embodiment, the standard gateway (210) is not equipped with an MDF, while the high-speed gateway (212) is equipped with an MDF. In an embodiment, subscriber management component (208) performs this update by updating a global allocation of UE-to-gateway mappings. In such an embodiment, the standard gateway (210) currently serving the UE (202) detects the change and hands over the session to high-speed gateway (212).

In step 220, after the handover, UE (202) communicates via the high-speed gateway (212). In an embodiment, the high-speed gateway (212) can comprise a 5G UPF or 4G PGW. In some embodiments, the high-speed gateway (212) comprises only a 5G UPF. In an embodiment, the high-speed gateway (212) performs the same user data connectivity functions as standard gateway (210). However, in an embodiment, the high-speed gateway (212) further includes an MDF configured to receive intercepted data from the high-speed gateway (212) and transmit the data to an LEMF, as discussed in connection with FIG. 1. In some embodiments, the high-speed gateway (212) can perform all LI functionalities known or to be known.

In some embodiments, step 220 can continue during the lifetime of the request (e.g., warrant). In one embodiment, a provisioning component (206) monitors the status of LI provisioning requests. In an embodiment, since UE (202) is mobile, the monitoring process (222) performed by provisioning component (206) ensures that the UE (202) remains communicatively coupled to the high-speed gateway (212) during the lifetime of the LI provisioning request. In some embodiments, the monitoring process includes a timer component that periodically ensures that the UE (202) is communicatively coupled to the high-speed gateway (212). In an embodiment, the monitoring process ensures that side provisioning requests from other network functions or devices do not cause an inadvertent handover of the UE (202) during the lifetime of the LI request. In an embodiment, the monitoring process (222) can issue a provisioning request (224) to cause a subscriber management component (208) to update (226) a gateway allocation for the UE (202). In an embodiment, the update (226) can be performed similar to the gateway allocation sub-process described in connection with step 218. In some embodiments, monitoring process 222, provisioning request 224, and update 226 can be executed repeatedly during the lifetime of an LI request.

In step 228, the ADMF (204) issues a request to remove the LI request. Alternatively, or in conjunction with the foregoing, step 228 can comprise receiving a notice that the LI provisioning request has expired. In either scenario, the subscriber management component (208) can receive the request/expiration and determine that the LI function should be disabled for the UE (202) and the UE (202) may be dynamically allocated to any available gateway. In response, in step 230, the subscriber management component (208) removes the static allocation of high-speed gateway (212) to the UE (202) and may thus release the UE (202) from the high-speed gateway (212). Thus, as an example, in step 232, the UE (202) is communicatively re-coupled to standard gateway (210). The UE (202) can be attached to other gateways or can remain attached to the high-speed gateway (212). In general, as part of step 230, the subscriber management component (208) disables the requirement that the UE (202) remain attached to high-speed gateway (212), however no limit is placed on how the cellular network can then allocate gateways to the UE (202). Thus, any technique for dynamic allocation of gateways can be employed after step 228.

Figure 3:
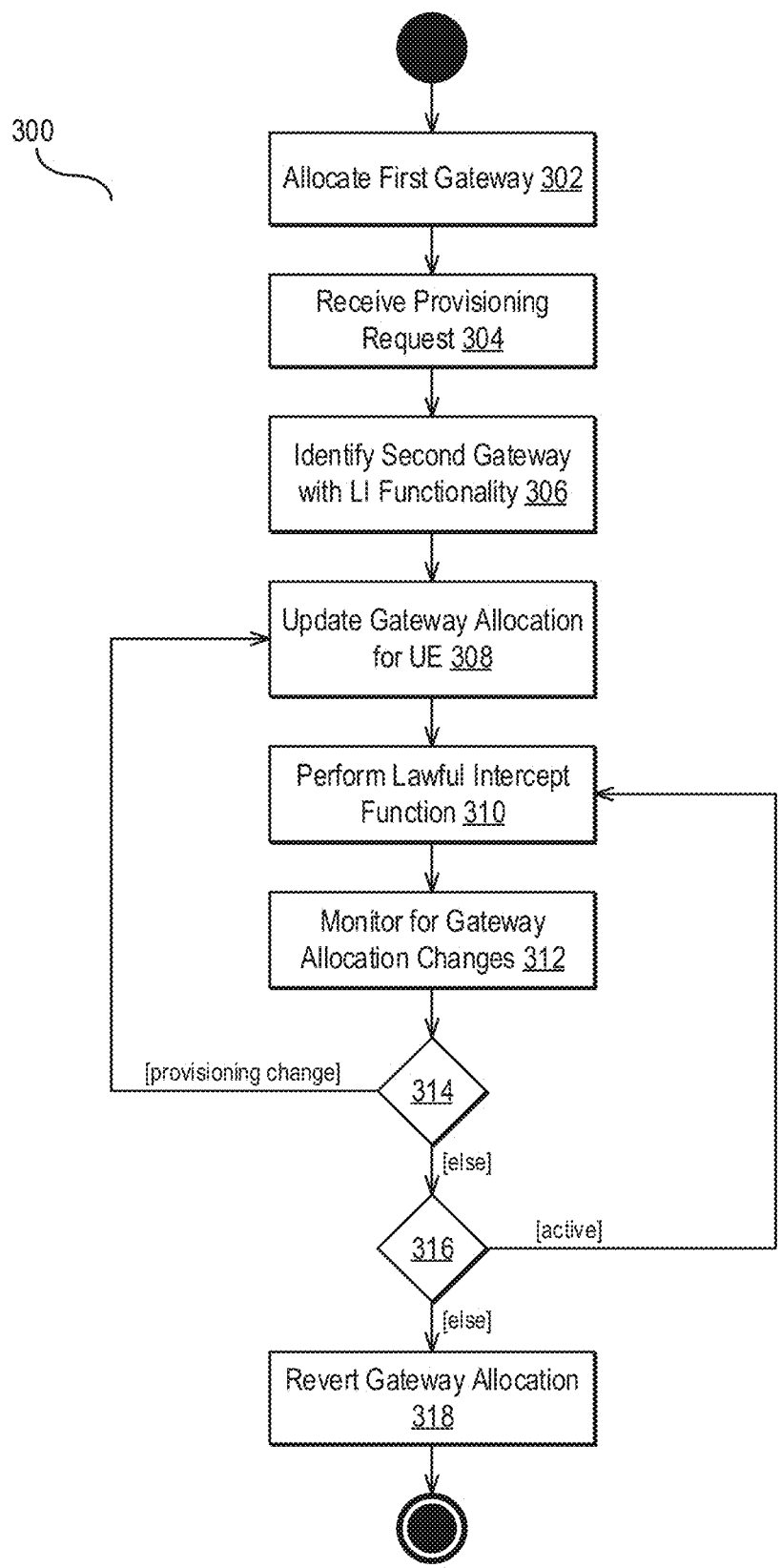
FIG. 3 is a flow diagram illustrating a method for performing a gateway re-allocation in response to a lawful intercept request according to some embodiments.

FIG. 3 is a flow diagram illustrating a method 300 for performing a gateway re-allocation in response to a lawful intercept request according to some embodiments. In an embodiment, method 300 can be executed by a subscriber management component or similar device.

In step 302, method 300 can comprise allocating a first gateway to a UE. In an embodiment, step 302 can comprise attaching a UE to a standard gateway to support standard cellular communications. In some embodiments, the first gateway can comprise a packet or serving gateway such as a UPF or P-GW. In an embodiment, step 302 can be executed using standard techniques in a cellular network. For example, step 302 can comprise allocating a first gateway by identifying a gateway physically closest to a UE, identifying a gateway having the most network capacity, identifying a gateway based on required or desired functionality, identifying a gateway based on a priority ranking or loading level, or allocating a gateway based on a static configuration. In an embodiment, the first gateway may not include any LI functionality such as an MDF. In an embodiment, the first gateway can correspond to gateway (106A) in FIG. 1 or standard gateway (210) in FIG. 2, the disclosure of which is not repeated herein.

In step 304, method 300 can comprise receiving a provisioning request associated with the UE.

In an embodiment, the provisioning request identifies an LI target associated with a UE. In an embodiment, method 300 receives the provisioning request from an ADMF, such as ADMF (114) or ADMF (204). In one embodiment, the provisioning request identifies a particular subscriber and other requirements of the lawful intercept. In an embodiment, the provisioning request may include a SUPI (Subscription Permanent Identifier), SUCI (Subscription Concealed Identifier), PEI (Permanent Equipment Identifier), GPSI (Generic Public Subscription Identifier), IMPU (IP multimedia public identity)/IMPI (IP multimedia private identity) or other value identifying a subscriber. In some embodiments, the identified subscriber can be associated with an existing session or may not be attached to the network.

In step 306, method 300 can comprise identifying a second gateway that supports an LI function, such as an MDF.

In an embodiment, method 300 can identify a plurality of gateways in the core network. In some embodiments, these gateways are geographically dispersed across a service area and are each associated with a distance from the UE. In an embodiment, each gateway may or may not be equipped with an MDF or similar functionality to perform an LI function.

In an embodiment, method 300 can first determine if the UE identified in the provisioning request is connected to a gateway. If so, method 300 can determine if the connected gateway includes an MDF. If so, method 300 can use the current gateway as the second gateway. If method 300 determines that the current gateway does not include an MDF, method 300 then determines a second gateway to hand over the UE to.

In one embodiment, identifying a second gateway comprises identifying the second gateway from a set of gateways supporting an LI function (e.g., include an MDF), the second gateway identified based on traffic volumes at each of the set of gateways. In this embodiment, method 300 can determine the gateway having the least amount of data traffic and also including an MDF.

In another embodiment, identifying a second gateway comprises identifying the second gateway from a set of gateways supporting an LI function (e.g., include an MDF), the second gateway identified based on a distance from the UE. In this embodiment, method 300 determines a second gateway that is physically nearest the UE, to reduce latency.

In some embodiments, both techniques can be used together. That is, method 300 can consider both the distance and the network load of each gateway including an MDF when determining the second gateway.

In step 308, method 300 can comprise updating a gateway allocation for the UE. In an embodiment, the gateway allocation causes the UE to communicate with the second gateway and disconnect from the first gateway.

In a cellular network, UEs can be assigned to gateways via Internet Protocol (IP) address allocations. Thus, when a UE registers or joins a cellular network, a given IP address can be assigned to the user. Other devices in the network can then route all user traffic to a given gateway associated with that IP address. The IP address can further be used as an external identifier to packet data networks such as the Internet.

In step 308, method 300 can instruct a device managing these IP address allocations to re-allocate an IP address to the second gateway. In a 5G implementation, method 300 can instruct a UPF to perform this allocation. In a 4G implementation, method 300 can instruct a P-GW and/or Serving Gateway (S-GW) to perform this allocation. After re-assigning the UE to an IP address handled by the second gateway, all communications from the UE can be transparently routed to the second gateway.

In step 310 method 300 can comprise performing a lawful intercept on the UE communications. In the illustrated embodiment, the LI function can comprise an MDF that receives intercepted communications, processes the communications, and forwards the processed communications to an LEMF or similar system. Details of an LI function are not elaborated on in detail and can be performed using any known or to be known LI function in a cellular or other network. As will be discussed, method 300 can perform the LI function at the second gateway while the provisioning request is valid.

In step 312, method 300 can comprise monitoring for gateway allocation changes. In an embodiment, gateway allocation changes can occur due to change in the UE location as well as other side provisioning requests. Such requests are generally part of the operation of a cellular network. However, in the embodiments, method 300 prevents such changes to ensure that the UE is persistently assigned to the second gateway. That is, method 300 enforces a static gateway assignment and prevents dynamic assignment of gateways (e.g., via dynamic IP assignment). In an embodiment, method 300 can registers with any and all devices configured to update a gateway allocation and intercept these changes in gateway allocation before they are applied. In another embodiment, method 300 can instruct the gateways to deny any changes in gateway allocation for a given target profile unless method 300 disables the static allocation.

In step 314, method 300 determines whether a gateway allocation has changed. If so, method 300 repeats step 308, step 310, and step 312 to ensure that the UE remains communicatively coupled to the second gateway. That is, if method 300 determines that the cellular network is requesting a gateway change (e.g., IP re-assignment) due to, for example, a location change or network congestion, method 300 will instruct the gateways to ignore the request and will instead re-execute step 308, step 310, and step 312 to maintain a static route from the UE to the second gateway. In an alternative embodiment, method 300 may leverage this attempt to re-allocate gateways to find a more suitable gateway that also includes an LI function. Thus, in some embodiments, method 300 can switch from the second gateway to a third gateway that also supports an LI function. For example, method 300 can determine that the second gateway is experiencing network congestion or that the third gateway is closer to the UE and is not experiencing congestion. As illustrated, step 314 can be performed periodically to update the gateway allocation and maintain a communication session between the UE and the second gateway (or other gateway supporting LI functionality).

In step 316, method 300 determines if the LI provisioning request is still active. If so, method 300 repeats step 308, step 310, step 312, and step 314 to ensure that the UE remains communicatively coupled to the second gateway. In an embodiment, step 316 can comprise determining that the provisioning request has expired. Alternatively, or in conjunction with the foregoing, step 316 can include determining if an LEA has affirmatively ended the lawful intercept. In either event, method 300 determines that the LI function performed by the second gateway should be terminated and proceeds to step 318.

In step 318, after method 300 determines that the LI provisioning request is no longer active, method 300 reverts the gateway allocation. In an embodiment, step 318 can comprise updating the gateway allocation to release the UE from the second gateway. In some embodiments, the UE can then be allocated to the first gateway or other gateways regardless of whether they support an LI function. In an embodiment, method 300 disables the LI function (e.g., MDF) using any standard for disabling a lawful intercept. Additionally, method 300 instructs the gateways to disable static assignment and enable dynamic assignment of gateways (e.g., via IP address assignment). Thus, method 300 performs the same functionality as provided in step 302 in step 318 after disabling the dynamic gateway allocation.

Figure 4:
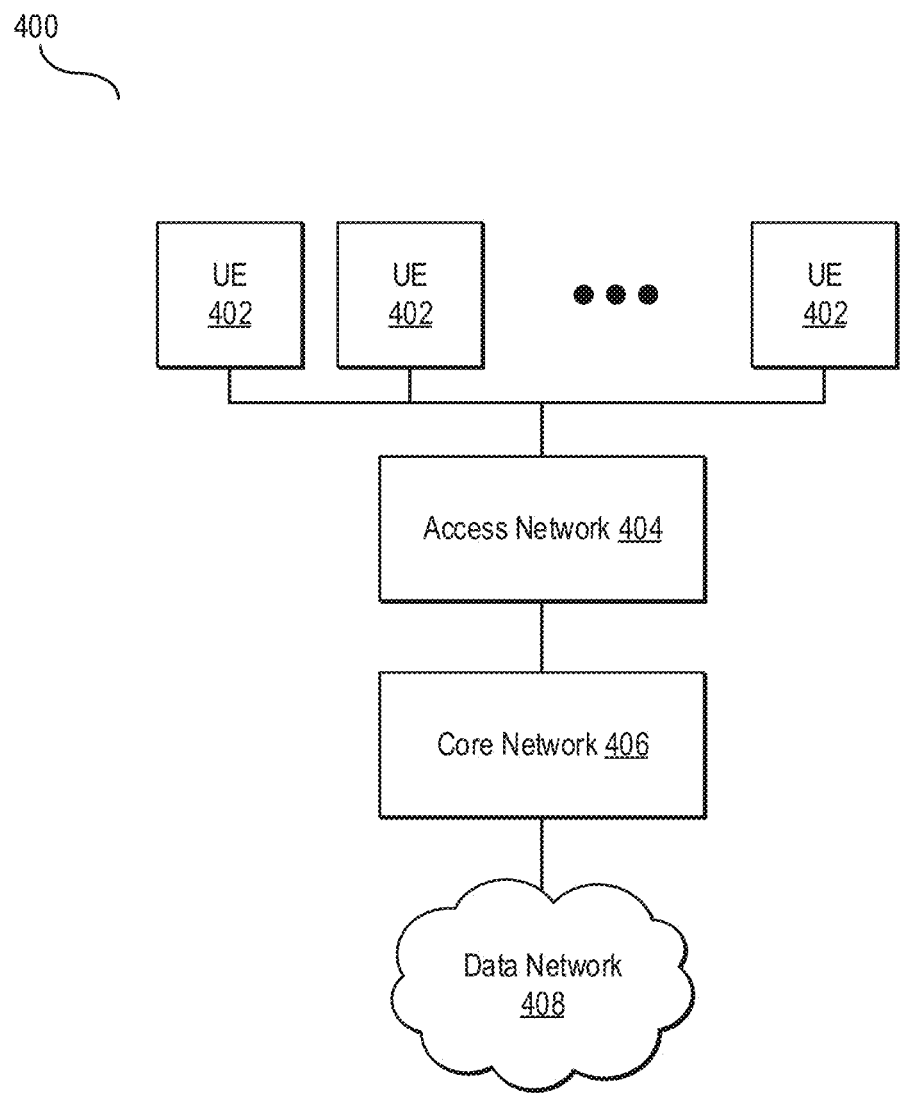
FIG. 4 is a block diagram of a cellular network according to some embodiments.

FIG. 4 is a block diagram of a cellular network according to some embodiments.

As illustrated, a system (400) includes UE (402) that accesses a data network (408) via an access network (404) and a core network (406). In the illustrated embodiment, UE (402) comprises any computing device capable of communicating with the access network (404). As examples, UE (402) may include mobile phones, smartphones, tablets, laptops, sensors, Internet of Things (IoT) devices, and any other devices equipped with a cellular transceiver. One example of a UE is provided in FIG. 6.

In the illustrated embodiment, the access network (404) comprises a network allowing over-the-air network communication with UE (402). In general, the access network (404) includes at least one base station that is communicatively coupled to the core network (406) and wirelessly coupled to UE (402).

In one embodiment, the access network (404) comprises a fifth-generation (5G) cellular access network. In one embodiment, the access network (404) and UE (402) comprise a NextGen Radio Access Network (NG-RAN). In an embodiment, the access network (404) includes a plurality of next Generation Node B (gNodeB) base stations connected to UE (402) via an air interface. In one embodiment, the air interface comprises a New Radio (NR) air interface. In some embodiments, an NR interface utilizes a Cyclic Prefix Orthogonal Frequency-Division Multiple Access (CP-OFDM) downlink modulation scheme and either CP-OFDM or Discrete Fourier Transform Spread Orthogonal Frequency Division Multiplexing (DFT-s-OFDM) uplink modulation scheme. In these embodiments, the gNodeB provides all functionality to implement and operate the air interface and negotiates uplinks and downlinks with the UE (402). The gNodeB may additionally include multiple network interfaces for communicating with the core network (406). In one embodiment, the gNodeB includes an interface to communicate with a mobility manager (e.g., an AMF) and a second interface to communicate with one or more gateway elements in the core network (406), such as an SMF for control data or a UPF for user data. In one embodiment, the mobility manager manages control plane traffic while the gateway elements manage user data traffic, as will be discussed. In some embodiments, base stations in the access network (404) are communicatively connected. For example, in a 5G network, individual gNodeB devices can be communicatively coupled via an X2 interface.

In one embodiment, the access network (404) comprises a fourth-generation (4G) cellular access network. In some embodiments, the access network (404) comprises an LTE access network. In one embodiment, the access network (404) and UE (402) comprise an Evolved Universal Mobile Telecommunications System (UMTS) Terrestrial Radio Access Network (E-UTRAN). In an embodiment, the access network (404) includes a plurality of Evolved Node B (eNodeB) base stations connected to UE (402) via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (402). The eNodeB may additionally include multiple network interfaces for communicating with the core network (406). In one embodiment, the eNodeB includes an interface to communicate with a mobility manager (e.g., a Mobility Management Entity, MME) and a second interface to communicate with one or more gateway elements in the core network (406), such as an S-GW or P-GW. In one embodiment, the mobility manager manages control plane traffic while the gateway elements manage user data traffic, as will be discussed. In some embodiments, base stations in the access network (404) are communicatively connected. For example, in a 4G network, individual eNodeB devices can be communicatively coupled, for example, via an X2 interface or any other interface.

In some embodiments, the access network (404) may operate in a dual-connectivity mode wherein UE (402) connects to multiple base stations in the access network (404) simultaneously. In some embodiments, dual connectivity may be implemented via New Radio Dual Connectivity (NR-DC), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network (404) provides access to a core network (406) to the UE (402). In the illustrated embodiment, the core network may be owned and/or operated by a mobile network operator (MNO) and provides wireless connectivity to UE (402). In the illustrated embodiment, this connectivity may comprise voice and data services. The core network (406) includes various computing devices, which are described briefly herein. Further detail of such devices is provided in FIG. 5.

At a high level, the core network (406) may include a user plane and a control plane. In one embodiment, the control plane comprises network elements and communications interfaces to allow for the management of user connections and sessions. By contrast, the user plane may comprise network elements and communications interfaces to transmit user data from UE (402) to elements of the core network (406) and to external network-attached elements in a data network (408) such as the Internet. An example of a control plane function comprises authenticating that a user can access the core network (406) (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network (406) may include a mobility manager, one or more gateways (e.g., a serving gateway and packet gateway), and a subscriber database. In practice, the core network (406) may include more components than these. In a 4G network, the mobility manager may be implemented by an MME, the serving gateway by an S-GW, the packet gateway by a P-GW, and the subscriber database by an HSS. In a 5G network, the mobility manager may be implemented by an Access Mobility Management Function (AMF), Session Management Function (SMF), and an Authentication Server Function (AUSF). Specifically, the AMF performs mobility management while the SMF performs session management, both of which are described herein. Further, the AUSF obtains authentication vectors from a subscriber database. In a 4G network, the Mobility Management Entity (MME) performs all these functions. The 4G serving gateway (S-GW) in a 5G network may be implemented by the SMF as well. Specifically, packet routing from the base station to the packet gateway may be handled by the SMF in contrast to the S-GW in a 4G network. In a 5G network, the packet gateway function user plane may be implemented by the UPF, which provides packet routing from the serving gateway to external services and manages Internet Protocol (IP) address allocation as well as content filtering and blocking. In a 5G network, the subscriber database may be implemented by a UDR, which stores the subscriber data. Access to the UDR may be mediated by a UDM, which is part of the subscriber database, as described herein.

In brief, a UE (402) communicates with the mobility manager to authenticate and establish a session or bearer with the serving and packet gateways. The mobility manager accesses the subscriber data to confirm the UE (402) identity and communicates with the serving gateway to establish the session. Once established, the UE (402) transmits data requests through the session to the packet gateway, which manages the transmitting and receiving data to and from external network services. Specific details of these elements are provided in the following figures.

In the illustrated embodiment, the access network (404) and the core network (406) are operated by an MNO. However, in some embodiments, the networks (404, 106) may be operated by a private entity and may be closed to public traffic. For example, the components of the core network (406) may be provided as a single device, and the access network (404) may comprise a small form-factor base station. In these embodiments, the operator of the device can simulate a cellular network, and UE (402) can connect to this network akin to connecting to a national or regional network. Further details on this implementation are described more fully in the description of FIG. 5.

Figure 5:
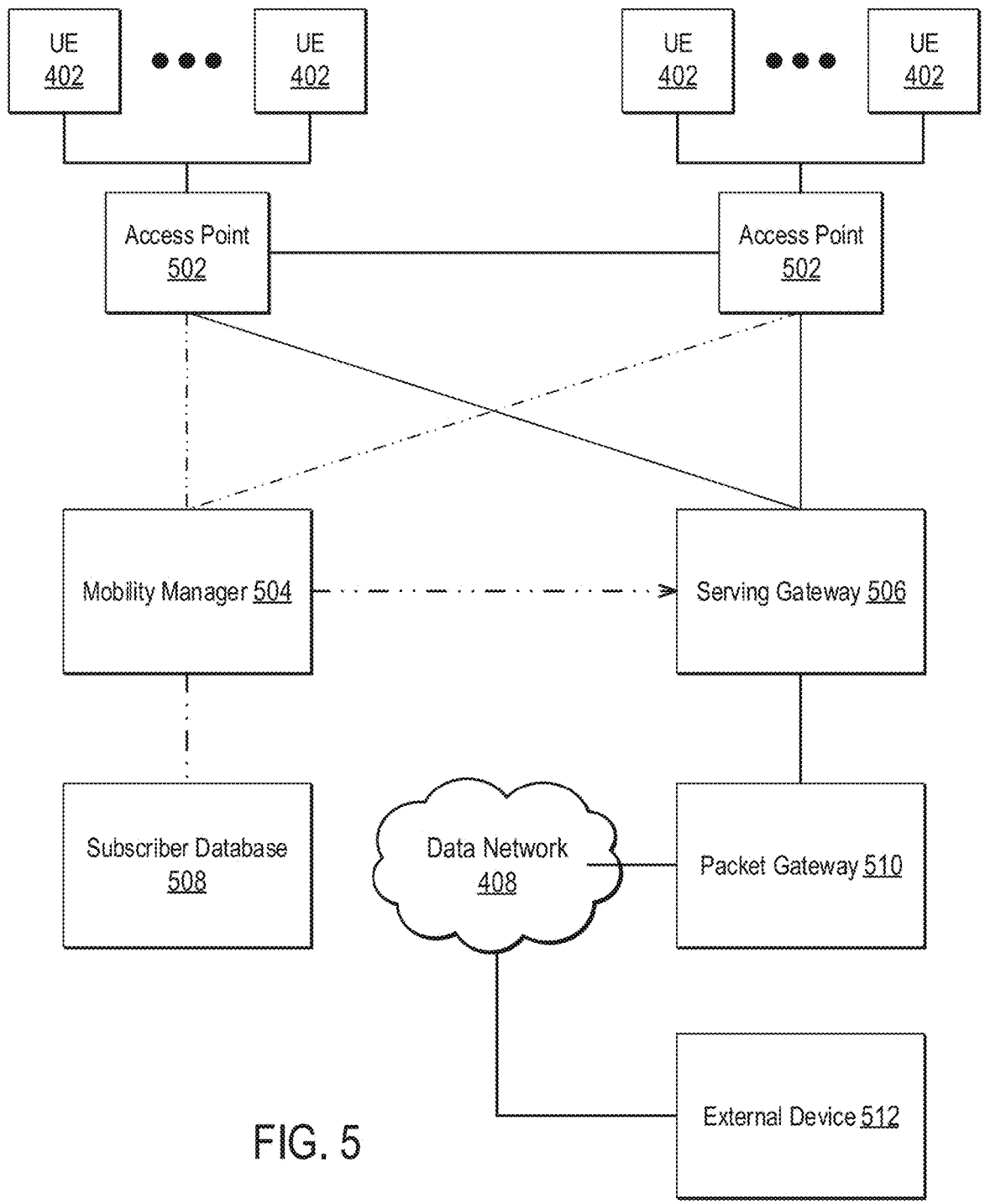
FIG. 5 is a block diagram illustrating a cellular network according to some embodiments.

FIG. 5 is a block diagram illustrating a cellular network according to some embodiments.

In the illustrated embodiment, a system (500) includes UE (402) communicatively connected to access points (502). As seen in FIG. 5, the access points (502) form an access network such as access network (404). In one embodiment, the access points (502) and UE (402) comprise a NextGen Radio Access Network (NG-RAN). In an embodiment, the access points (502) comprise a plurality of gNodeB base stations connected to UE (402) via an air interface. In one embodiment, the air interface comprises a New Radio (NR) air interface. The gNodeB additionally includes multiple network interfaces for communicating with the core network and, specifically, mobility manager (504) and serving gateway (506). In one embodiment, the mobility manager (504) in a 5G network comprises an AMF. In one embodiment, the serving gateway (506) comprises an SMF for control data or UPF for user data.

In another embodiment, the access points (502) comprise eNodeB base stations connected to UE (402) via an air interface. In some embodiments, the air interface comprises an E-UTRAN Uu or LTE Uu radio air interface. In these embodiments, the eNodeB provides all functionality to implement and operate the air interface and negotiates uplinks and downlinks with the UE (402). The eNodeB additionally includes multiple network interfaces for communicating with the core network and, specifically, mobility manager (504) and serving gateway (506). In one embodiment, the mobility manager (504) comprises an MME in a 4G network. In the illustrated embodiment, solid lines between network elements (504, 506, 508, and 510) represent user data traffic, while dashed lines between network elements (504, 506, 508, and 510) represent control or Non-Access Stratum (NAS) traffic.

In the illustrated embodiment, the mobility manager (504) manages control plane traffic while the gateway elements (506, 510) manage user data traffic. Specifically, the mobility manager (504) may comprise hardware or software for handling network attachment requests from UE (402). As part of processing these requests, the mobility manager (504) accesses a subscriber database (508). The subscriber database (508) comprises hardware or software that stores user authorization and authentication data and validates users to the network. In some embodiments, the subscriber database (508) may comprise a UDM and UDR in a 5G network. In another embodiment, the subscriber database (508) may comprise an HSS in a 4G network. In one embodiment, the subscriber database (508) may also store a location of the user updated via a Diameter or similar protocol.

The mobility manager (504) may also be configured to create data sessions or bearers between UE (402) and serving gateway (506) or gateway (510). In one embodiment, the serving gateway (506) and gateway (510) may comprise single or separate devices. In general, the serving gateway (506) routes and forwards user data packets while also acting as the mobility anchor for the user plane during access point handovers and as the anchor for mobility between different network technologies. For idle state UE (402), the serving gateway (506) terminates the downlink data path and triggers paging when downlink data arrives for the UE (402). The serving gateway (506) manages and stores UE (402) contexts, e.g., parameters of the IP bearer service, network internal routing information. In a 5G network, the serving gateway (506) may be implemented by an SMF. In a 4G network, the serving gateway (506) may be implemented by an S-GW.

The serving gateway (506) is communicatively coupled to a gateway (510). In general, the gateway (510) provides connectivity from the UE (402) to external Packet Data Networks (PDNs) such as data network (408) by being the point of exit and entry of traffic to external networks (e.g., 108). UE (402) may have simultaneous connectivity with a plurality gateways, including gateway (510) for accessing multiple packet data networks. The gateway (510) performs policy enforcement, packet filtering for each user, charging support, lawful interception, and packet screening. In the illustrated embodiment, the gateway (510) also limits access to endpoints such as an external device (512). In a 5G network, the gateway (510) may be implemented by a UPF. In a 4G network, the gateway (510) may be implemented by a P-GW.

In the illustrated embodiment, an external device (512) is communicatively coupled to the core network via the data network (408). In one embodiment, the data network (408) may comprise the Internet. In the illustrated embodiment, the external device (512), such as an application server, may comprise any electronic device capable of communicating with the data network (408), and the disclosure is not limited to specific types of network devices.

Figure 6:
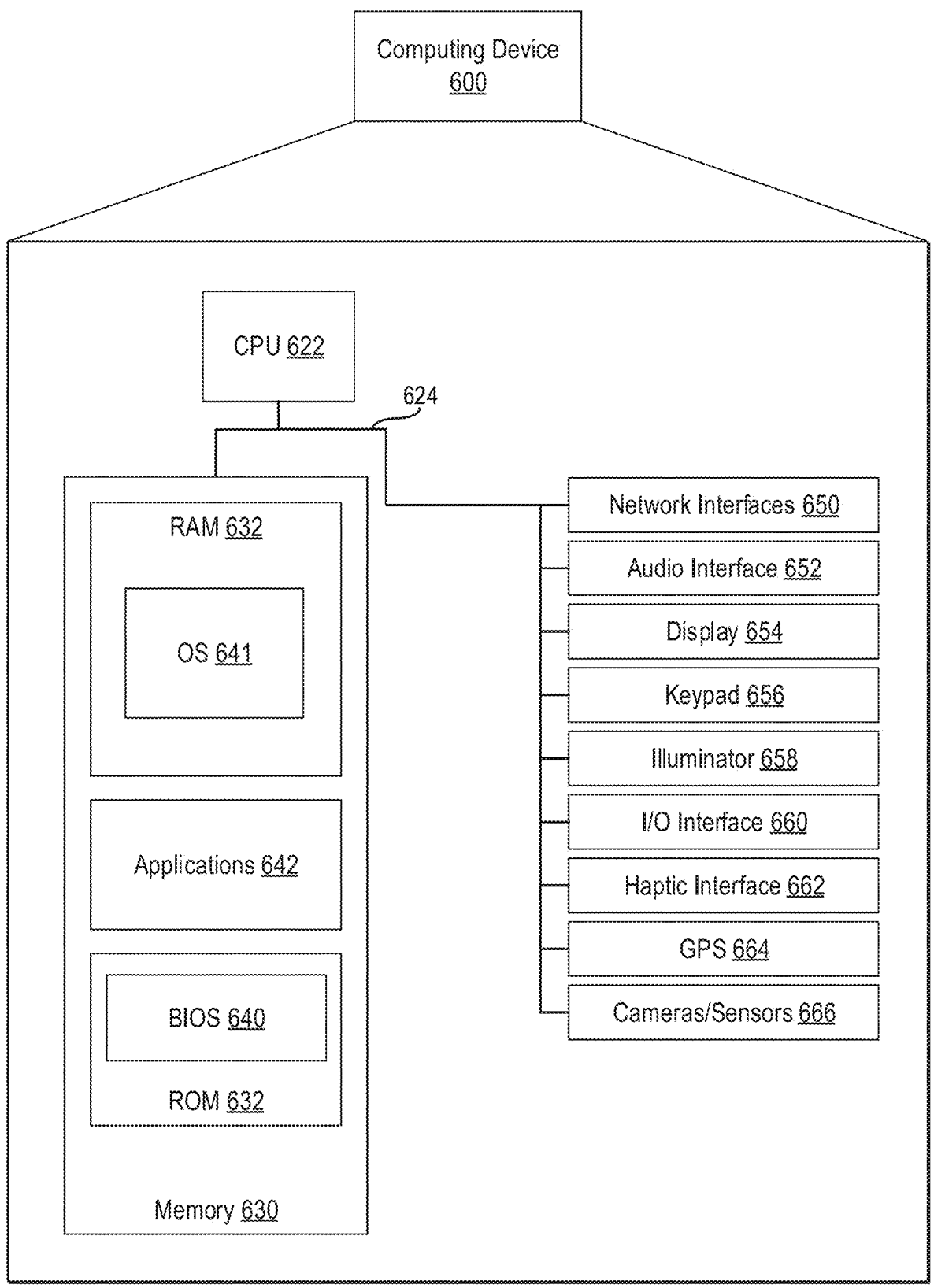
FIG. 6 is a block diagram illustrating a computing device used in the various embodiments of the disclosure.

FIG. 6 is a block diagram illustrating a computing device showing an example of a client or server device used in the various embodiments of the disclosure.

The computing device (600) may include more or fewer components than those shown in FIG. 6, depending on the deployment or usage of the computing device (600). For example, a server computing device, such as a rack-mounted server, may not include an audio interface (652), display (654), keypad (656), illuminator (658), haptic interface (662), Global Positioning System (GPS) receiver such as GPS receiver (664), or cameras/sensors (666). Some devices may include additional components not shown, such as graphics processing unit (GPU) devices, cryptographic co-processors, artificial intelligence (AI) accelerators, or other peripheral devices.

As shown in the figure, the computing device (600) includes a central processing unit (CPU) (622) in communication with a mass memory (630) via a bus (624). The computing device (600) also includes a network interface (650), an audio interface (652), a display (654), a keypad (656), an illuminator (658), an input/output interface (660), a haptic interface (662), a GPS receiver (664) and a camera(s) or other optical, thermal, or electromagnetic cameras/sensors (666). The computing device (600) can include a plurality of cameras/sensors (666). The positioning of the cameras/sensors (666) on the computing device (600) can change per computing device (600) model, per computing device (600) capabilities, and the like, or some combination thereof.

In some embodiments, the CPU (622) may comprise a general-purpose CPU. The CPU (622) may comprise a single-core or multiple-core CPU. The CPU (622) may comprise a system-on-a-chip (SoC) or a similar embedded system. In some embodiments, a GPU may be used in place of, or in combination with, a CPU (622). Mass memory (630) may comprise a dynamic random-access memory (DRAM) device, a static random-access memory device (SRAM), or a Flash (e.g., NAND Flash) memory device. In some embodiments, mass memory (630) may comprise a combination of such memory types. In one embodiment, the bus (624) may comprise a Peripheral Component Interconnect Express (PCIe) bus. In some embodiments, the bus (624) may comprise multiple busses instead of a single bus.

Mass memory (630) illustrates another example of computer storage media for the storage of information such as computer-readable instructions, data structures, program modules, or other data. Mass memory (630) stores a basic input/output system, BIOS (640), for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from a hard disk drive (not illustrated) and temporarily stored in RAM (632) by CPU (622). CPU (622) may then read the software or data from RAM (632), process them, and store them in RAM (632) again.

The computing device (600) may optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises an input/output interface (660) for communicating with external devices, using communication technologies, such as USB, infrared, Bluetooth™, or the like. The haptic interface (662) provides tactile feedback to a user of the client device.

The GPS receiver (664) can determine the physical coordinates of the computing device (600) on the surface of the Earth, which typically outputs a location as latitude and longitude values. GPS receiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   allocating a first gateway to user equipment (UE);
   receiving a provisioning request, the provisioning request identifying a lawful intercept (LI) target associated with the user equipment (UE);
   determining that the first gateway does not support a LI function;
   identifying a second gateway, the second gateway supporting an LI function;
   updating a gateway allocation for the UE, wherein the updating causes the UE to communicate with the second gateway; and
   performing the LI function at the second gateway while the provisioning request is valid.

2. The method of claim 1, wherein identifying the second gateway comprises identifying a high-speed packet gateway communicatively coupled to a Mediation and Delivery Function (MDF).

3. The method of claim 1, wherein identifying the second gateway comprises identifying, the second gateway from a set of gateways supporting an LI function, the second gateway identified based on traffic volumes at each of the set of gateways.

4. The method of claim 1, wherein identifying a second gateway comprises identifying the second gateway from a set of gateways supporting an LI function, the second gateway identified based on a physical distance from the UE.

5. The method of claim 1, wherein identifying a second gateway comprises identifying a high-speed gateway, the high-speed gateway comprising a User Plane Function (UPF).

6. The method of claim 1, further comprising periodically updating the gateway allocation to maintain a communication session between the UE and the second gateway.

7. The method of claim 1, further comprising determining that the provisioning request has expired and updating the gateway allocation to release the UE from the second gateway.

8. A non-transitory computer-readable storage medium for storing instructions executable by a processor, the instructions comprising:
   allocating a first gateway to user equipment (UE);
   receiving a provisioning request, the provisioning request identifying a lawful intercept (LI) target associated with the UE;
   determining that the first gateway does not support a LI function;
   identifying a second gateway, the second gateway supporting an LI function;

updating a gateway allocation for the UE, wherein the updating causes the UE to communicate with the second gateway; and performing the LI function at the second gateway while the provisioning request is valid.

9. The non-transitory computer-readable storage medium of claim 8, wherein identifying a second gateway comprises identifying a high-speed packet gateway communicatively coupled to a Mediation and Delivery Function (MDF).

10. The non-transitory computer-readable storage medium of claim 8, wherein identifying the second gateway comprises identifying the second gateway from a set of gateways supporting an LI function, the second gateway identified based on traffic volumes at each of the set of gateways.

11. The non-transitory computer-readable storage medium of claim 8, wherein identifying a second gateway comprises identifying the second gateway from a set of gateways supporting an LI function, the second gateway identified based on a physical distance from the UE.

12. The non-transitory computer-readable storage medium of claim 8, wherein identifying a second gateway comprises identifying a high-speed gateway, the high-speed gateway comprising a User Plane Function (UPF).

13. The non-transitory computer-readable storage medium of claim 8, the instructions further comprising periodically updating the gateway allocation to maintain a communication session between the UE and the second gateway.

14. The non-transitory computer-readable storage medium of claim 8, the instructions further comprising determining that the provisioning request has expired and updating the gateway allocation to release the UE from the second gateway.

15. A device comprising:
a processor configured to:
 allocate a first gateway to user equipment (UE);
 receive a provisioning request, the provisioning request identifying a lawful intercept (LI) target associated with the UE;
 determining that the first gateway does not support a LI function;
 identify a second gateway, the second gateway supporting an LI function;
 update a gateway allocation for the UE, wherein the updating causes the UE to communicate with the second gateway; and
 perform the LI function at the second gateway while the provisioning request is valid.

16. The device of claim 15, wherein identifying the second gateway comprises identifying the second gateway from a set of gateways supporting an LI function, the second gateway identified based on traffic volumes at each of the set of gateways.

17. The device of claim 15, wherein identifying a second gateway comprises identifying the second gateway from a set of gateways supporting an LI function, the second gateway identified based on a physical distance from the UE.

18. The device of claim 15, wherein identifying a second gateway comprises identifying a high-speed gateway, the high-speed gateway comprising a User Plane Function (UPF).

19. The device of claim 15, further comprising periodically updating the gateway allocation to maintain a communication session between the UE and the second gateway.

20. The device of claim 15, the processor further configured to determine that the provisioning request has expired and update the gateway allocation to release the UE from the second gateway.

* * * * *